United States Patent [19]

Curnuck

[11] 4,097,902

[45] Jun. 27, 1978

[54] TELEVISION LIGHT SHIELD

[76] Inventor: Roy F. Curnuck, 243 Elm Dr., Levittown, N.Y. 74226

[21] Appl. No.: 777,629

[22] Filed: Mar. 15, 1977

[51] Int. Cl.² .......................... H01J 24/06; H04N 5/64
[52] U.S. Cl. ...................................... 358/255; 353/75; 353/97
[58] Field of Search ................... 358/254, 258; 353/74, 353/75, 97

[56] References Cited

U.S. PATENT DOCUMENTS

| 3,781,471 | 12/1973 | Hoffberger et al. | 358/255 |
| 3,849,598 | 11/1974 | Hoffberger et al. | 358/255 |

*Primary Examiner*—Robert L. Griffin
*Assistant Examiner*—Edward L. Coles
*Attorney, Agent, or Firm*—Robert T. DeMarco

[57] ABSTRACT

This device is designed to be affixed to the television screen for functional value is based upon a general enhancement of the picture, yielding a more sensual viewing experience. The capacity of television is improved by this apparatus for the singular image normally viewed is reflected onto plates surrounding the screen. The scope of television is thus broadened for the original image is accented by the various reflections projected from different viewpoints.

5 Claims, 2 Drawing Figures

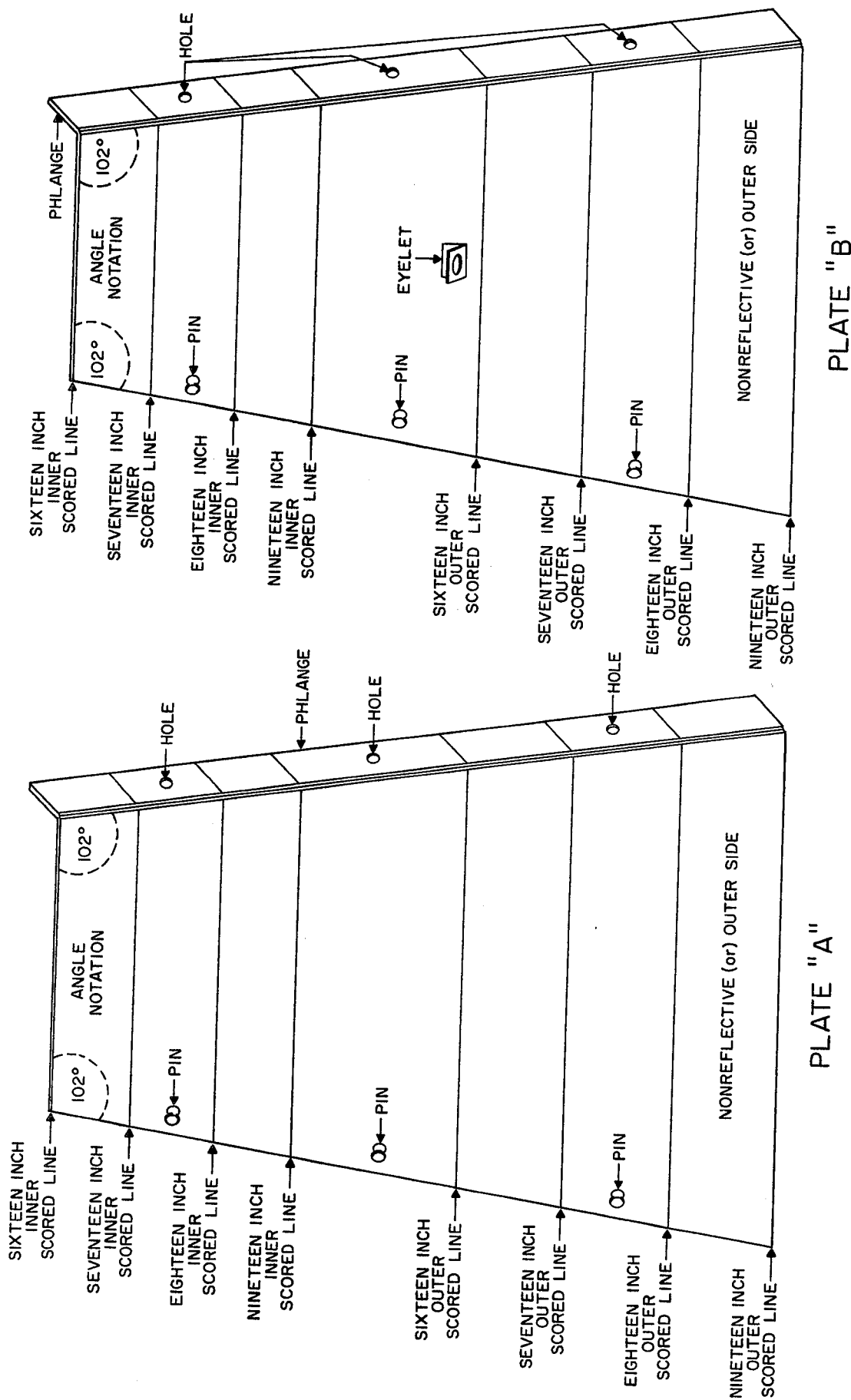

TELEVISION LIGHT SHIELD

FIG. 2 is a section of the television light shield used in FIG. 1.

Figure 1:
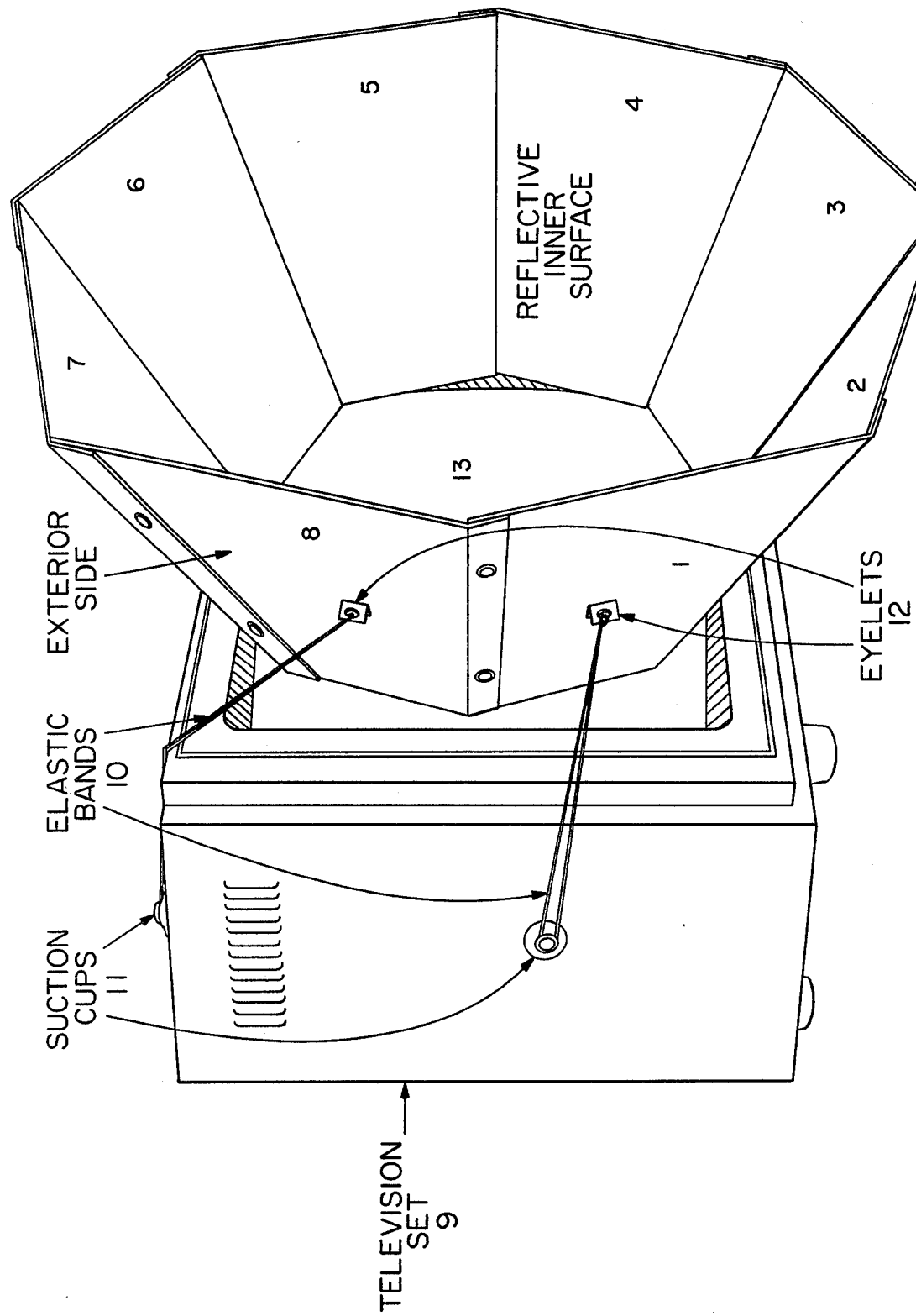
FIG. 1 is a schematic perspective view of the television light shield embodying the present invention.

DETAILED DESCRIPTION
REFER TO FIG. I

This device facilitates a series of eight additional images of the initial telecast due to reflective plates surrounding and protruding off the television screen (13)*. Eight separate plates (1-8) attach to one another forming an eight paneled structure with a reflective quality on the inner surface. This mirrorizing characteristic coupled with the angle at which the plates extend off the television screen is capable of broadening one's consciousness of the original image being viewed, for now a singular object is seen eight more times and from varying perspectives. The surface extension of the screen by the plates seemingly gives added depth and dimension to the now larger viewing medium. Viewing television becomes more stimulating for this apparatus adds and re-directs movement and illuminations.

*numbers refer to specific locations in FIG. I

A simple attachment procedure is employed, for this device is connected to the television set by four elastic bands (10). These bands have suction cups (11) connected on one end while the other end is threaded through eyelets (12) situated on the exterior side of the plates marked B (1,4,5,8). To insure proper tension enabling the device to be steadily pulled against the screen one needs only to move the suction cups further back or forward on the side and top of the television set.

REFERENCE TO FIG. II

It is important to realize that this apparatus can be easily adapted to fit either 16, 17, 18, and 19 inch diagonally measured television screens. Focus attention on plate A and examine the "scored" lines located on the non reflective or outer side of the plate. A series of "inner" and "outer" dimensions are depicted and correspond to the measurements of 16, 17, 18, and 19 inch screens. Once the corresponding inner and outer extremities of the desired size plate have been determined one need only to cut along the scored lines and that particular plate will have been readied for assembly. For example if an A plate for a 17 inch set is to be prepared then the scored lines labelled 17 inch inner and 17 inch outer should be identified and cut at those two lines. Naturally the same process follows for the preparation of B plates.

This device consists of two different sets of plates with each set containing four equally sized plates. Plates labeled A are members of one set while plates labeled B form the alternate set, thus yielding a total of eight plates. Actually the only difference between the two plates is based upon the fact that the overall width of plate A is one inch wider than plate B. It is critical to realize that the angle formed on both sides between the inner base and its respective tangent side remains the same regardless of the size of the plate. Specifically, this obtuse angle is 102° degrees (refer to angle notations on FIG. II).

Once the individual plates both A and B have been cut to fit a particular size screen they are now ready for assembly to one another. Final construction of this device is fundamental, for located along the edge of each prepared plate will be a total of two vertical pins which are designed to snap into corresponding holes situated in the phlange protruding off of the next correctly ordered plate. A specific sequence is to be adhered to when connecting the plates to one another for once two A plates have been coupled, two B plates should follow and then back to the A plates in an alternating manner until all eight plates are positioned as illustrated in FIG. I.

I claim:

1. A detachable and adjustable television light shield for providing a generally enhanced picture comprising
   a series of eight plates that are attachable in an octagonal fashion to provide said light shield
   wherein said series of eight plates are formed from two sets of four plates each,
   said sets of plates differ from each other by 1 inch in width
   said plates consist of a reflective inner surface and a non-reflective outer surface, wherein the reflective inner surface is positioned to receive and reflect the images from the television faceplate
   mounted on said plates are eyelets, which are attachable to suction cups by elastic bands,
   said suction cups are strategically placed on the cabinet of the television set, thereby providing adequate support for said light shield.

2. The light shield as claimed in claim 1, is adaptable to fit either a 16, 17, 18, or 19 inch diagonally measured television screen.

3. The light shield as claimed in claim 1, comprises plates which consist of holes on one side and pins on the opposite side, wherein the holes and pins of adjacent plates are attachable to form said light shield.

4. The light shield as claimed in claim 1, comprises plates which at the end closest to the television screen comprises an angle formed by an inner base and either side left or right, wherein said angle should be no less than 98° but not more than 108°.

5. The light shield as claimed in claim 4, wherein said angle of 102° allows for the fullest potential to the viewer.

* * * * *